(12) United States Patent
Poschinger et al.

(10) Patent No.: US 10,883,845 B2
(45) Date of Patent: Jan. 5, 2021

(54) METHOD OF DETECTING A VIRTUAL TOLLING POINT

(71) Applicant: Kapsch TrafficCom AG, Vienna (AT)

(72) Inventors: Christian Poschinger, Neusiedl am See (AT); Thomas Siegl, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 416 days.

(21) Appl. No.: 15/722,895

(22) Filed: Oct. 2, 2017

(65) Prior Publication Data

US 2018/0094942 A1    Apr. 5, 2018

(30) Foreign Application Priority Data

Oct. 5, 2016 (EP) .................................. 16192337

(51) Int. Cl.
*G01C 21/34* (2006.01)
*G01C 21/30* (2006.01)
(Continued)

(52) U.S. Cl.
CPC ......... *G01C 21/3461* (2013.01); *G01C 21/30* (2013.01); *G01S 19/14* (2013.01);
(Continued)

(58) Field of Classification Search
CPC ..... G01C 21/3461; G01C 21/30; G01S 19/14; G07B 15/06; G07B 15/00; H04W 4/021; H04W 4/44; G06Q 2240/00
See application file for complete search history.

(56) References Cited

U.S. PATENT DOCUMENTS 5,359,528 A    10/1994  Haendel et al.
5,717,389 A *  2/1998  Mertens ............... G07B 15/063
                                              340/928

(Continued)

FOREIGN PATENT DOCUMENTS

DE    4402614 A1    8/1995
DE    4310099 C2    9/1997
(Continued)

OTHER PUBLICATIONS

Smith, "The Scientist and Engineer's Guide to Digital Signal Processing", California Technical Publishing San Diego, CA, USA © 1997 (Year: 1997).*

(Continued)

*Primary Examiner* — Regis J Betsch
(74) *Attorney, Agent, or Firm* — Fiala & Weaver P.L.L.C.

(57) ABSTRACT

Methods for detecting the passing of a virtual tolling point by a vehicle travelling on a road network are performed by systems and apparatuses. In the methods, a sequence of distances between position fixes and the virtual tolling point are calculated, where the position fixes are sequentially obtained from a GNSS receiver carried by the vehicle. The sequence of distances are searched for a global minimum followed by an increase and, if such is found, then the passing of the virtual tolling point is detected. Otherwise, a new distance calculated between a newly obtained position fix and the virtual tolling point is appended to the sequence while discarding the oldest distance from the sequence. The method is then repeated from the sequence of distances being searched until the passing of the virtual tolling point is detected.

11 Claims, 3 Drawing Sheets

(51) Int. Cl.
*G01S 19/14* (2010.01)
*H04W 4/021* (2018.01)
*G07B 15/06* (2011.01)
*G07B 15/00* (2011.01)
*H04W 4/44* (2018.01)

(52) U.S. Cl.
CPC ............ *G07B 15/06* (2013.01); *H04W 4/021* (2013.01); *G06Q 2240/00* (2013.01); *G07B 15/00* (2013.01); *H04W 4/44* (2018.02)

(56) References Cited

U.S. PATENT DOCUMENTS

| | | | |
|---|---|---|---|
| 8,560,219 B2 * | 10/2013 | Weimann | G08G 1/207 701/300 |
| 2005/0258978 A1 * | 11/2005 | Hartinger | G01C 21/26 340/928 |
| 2013/0197857 A1 * | 8/2013 | Lu | G01S 19/19 702/141 |
| 2013/0293397 A1 | 11/2013 | Nagy et al. | |
| 2016/0171787 A1 * | 6/2016 | Yohalashet | G07B 15/063 705/13 |
| 2019/0228593 A1 * | 7/2019 | Liu | G08G 1/0116 |

FOREIGN PATENT DOCUMENTS

| | | |
|---|---|---|
| DE | 102005016814 B4 | 4/2008 |
| DE | 102004001906 B4 | 9/2013 |
| EP | 1821259 A2 | 8/2007 |
| EP | 2511892 B1 | 3/2013 |
| EP | 0824731 B2 | 11/2014 |
| WO | 1995/20801 A1 | 8/1995 |
| WO | 1999/33027 A1 | 7/1999 |

OTHER PUBLICATIONS

Extended European Search report received for European Patent Application No. 16192337.0, dated Apr. 3, 2017, 8 pages.

* cited by examiner

METHOD OF DETECTING A VIRTUAL TOLLING POINT

CROSS-REFERENCE TO RELATED APPLICATION(S)

This application claims priority to European Patent Application No. 16 192 337.0, filed on Oct. 5, 2016, the entirety of which is incorporated by reference herein.

TECHNICAL FIELD

The present subject matter relates to a method of detecting the passing of a virtual tolling point by a vehicle travelling on a road network.

BACKGROUND ART

The detection of predetermined geographical positions such as the coordinates of entries and exits of toll highways, virtual toll plazas, sections of toll roads, entries and exits of parking lots, borders, city centers, etc., called "virtual tolling points", is an important part of traffic toll systems that rely on onboard units (OBUs) carried by vehicles and generating a sequence of position fixes by means of a global navigation satellite system (GNSS) receiver. Once the passing of a virtual tolling point has been detected by the OBU or a central system to which the OBU has sent its sequence of position fixes, a fee can be charged for using the virtual tolling point, an authorization to pass the virtual tolling point can be checked, a violation enforced, and the like.

A multitude of methods are known to detect the passing of a virtual tolling point, e.g., by drawing an area around the virtual tolling point and determining one or more position fixes that fall within that area. Simpler methods compare the position fixes with a virtual tolling point and detect the passing when the respective distances between the position fixes and the virtual tolling point drop below a minimum threshold, which is equivalent to a circle drawn around the virtual tolling point and detecting whether a position fix falls within that circle. Methods of these kinds are, e.g., described in EP 0 824 731 B2, EP 2 511 892 B1, WO 99/33027 A1, U.S. Pat. No. 5,359,528, WO 95/20801 A1, DE 43 10 099 C2, DE 10 2005 016 814 B4, DE 10 2004 001 906 B4, DE 44 02 614 A1 and EP 1 821 259 A2. All these methods are either complicated and require substantial processing power in the OBU or the central system, or unreliable and prone to detection errors when they are simple.

BRIEF SUMMARY

An object of the disclosed subject matter is to overcome the drawbacks of the conventional art and to provide a method for detecting the passing of a virtual tolling point, which method is both easy to compute and yields robust and reliable detection results.

This object is achieved, according to embodiments, with a method of detecting the passing of a virtual tolling point by a vehicle travelling on a road network, comprising the steps in the following order:

a) calculating a sequence of distances between position fixes and the virtual tolling point, said position fixes being sequentially obtained from a GNSS receiver carried by the vehicle;

b) searching said sequence of distances for a global minimum followed by an increase and, if such is found, then c) detecting the passing of the virtual tolling point;

else d) appending a new distance calculated between a newly obtained position fix and the virtual tolling point to the sequence while discarding the oldest distance from the sequence, and returning to step b).

The method of the disclosed subject matter continuously analyzes the sequence, i.e., curve over time, of distances to a next virtual tolling point along the way by searching a global minimum followed by an increase, according to embodiments. This search is performed in a window, the "sequence", sliding over time and comprising the distances of the most recent position fixes to the virtual tolling point to detect. The detection criterion of searching for a global minimum followed by an increase in this window goes beyond the conventional "within a threshold area"-test of the conventional art, as it is independent of any predetermined threshold area, but self-adaptive, according to embodiments. The detection method of the disclosed subject matter is thus significantly more robust and less prone to detection errors than the known methods. At the same time, the detection criterion of the disclosed subject matter is easy to compute in real-time, even with modest processing means available in an onboard unit.

In one embodiment, the virtual tolling points are defined each as three-dimensional coordinates and the position fixes are obtained each as three-dimensional coordinates. The sequence of position fixes thus forms a polygonal "spline" in 3D space, and the distances are calculated as 3D distances between the points of the spline and the virtual tolling point. This allows for a discrimination between virtual tolling points that occur in the road network in close vicinity to each other but at difference heights, such as, e.g., in case of toll highways that cross each other at bridges or run in parallel at different levels.

A further embodiment comprises, preceding step a), the steps of:

storing a set of virtual tolling points of the road network in a memory;

obtaining a position fix from the GNSS receiver; and selecting, as said virtual tolling point, from said stored set a virtual tolling point that is nearest to said position fix.

This allows for an automatic selection of a starting point for the method in case of multiple virtual tolling points defined in the road network.

In the case of multiple virtual tolling points stored in the set that form nodes in a graph representing the road network, a further embodiment comprises, succeeding step c), the step:

selecting, from the stored set, as a virtual tolling point to be used in the further steps of the method, a virtual tolling point which is one of the neighbouring nodes of the virtual tolling point used so far, and returning to step a).

In this embodiment, the method makes use of a graph representation of virtual tolling points geographically distributed over the road network, in that after each passing of one virtual tolling point the method is repeated to detect the passing of that or those next virtual tolling point(s) which will be reached next by the vehicle in the road network. When there is more than one next neighbouring node, i.e., next reachable virtual tolling point, and when a first one of these is passed, then the method can optionally be aborted for the rest of said neighbouring nodes. In that way the method proceeds along the best path in the graph to always detect the passage of the next reachable virtual tolling point along the route of the vehicle.

According to a further optional feature of the disclosed subject matter, the increase that is to be detected in step b) is defined by two successively higher distances following the global minimum. This criterion is particularly easy to compute and robust.

According to a further optional variant of the disclosed subject matter, in step a) the position fixes or distances are smoothed over time, which removes outliers and enhances detection reliability.

Detection reliability can be further increased and computation time can be saved if in step b), when said global minimum lies above a first threshold and/or the difference between said global minimum and a global maximum of said sequence lies below a second threshold, the method directly proceeds to step d). Both criteria avoid an unnecessary search for the global minimum and increase if a virtual tolling point is too far off (global minimum is above first threshold) or the sequence (curve) of distances is too shallow (minimum-maximum spread is below second threshold), which can indicate an uncertain or too distant pass that could not be used for a reliable detection.

The method of the disclosed subject matter is suited for an implementation in real-time "on the go", i.e., in an onboard unit carried by the vehicle and comprising the GNSS receiver, a memory for storing virtual tolling point(s), a buffer for storing the sequence of distances, and a processor attached thereto for performing the steps of the method.

BRIEF DESCRIPTION OF THE DRAWINGS/FIGURES

The disclosed subject matter will now be explained in detail by means of exemplary embodiments thereof under reference to the enclosed drawings, in which.

DETAILED DESCRIPTION

Figure 1:
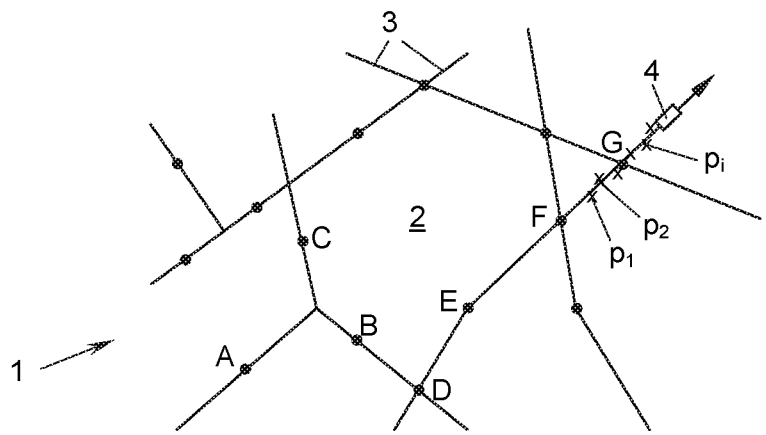
FIG. 1 shows a road network with virtual tolling points in form of a graph and an exemplary vehicle travelling on the road network in schematic form.

FIG. 1 shows a graph 1 of a road network 2 comprising a multitude of roads, traffic areas, parking lots, etc. 3, on which vehicles 4 can travel. The vehicles 4 each carry an onboard unit (OBU) 5 (FIG. 3), which has a global navigation satellite system (GNSS) receiver 6. The GNSS receiver 6 generates a sequence of position fixes $p_1, p_2, \ldots$, generally $p_i$, of the geographical position of the OBU 5 in the road network 2.

The OBU 5 can, e.g., be an active or passive transponder, a wireless tag, a transceiver, a mobile phone or smart phone, or generally any other electronic device equipped with or consisting of a GNSS receiver 6 that can be carried by or mounted in or on the vehicle 4.

Within the road network 2, a set of virtual tolling points A, B, C, ..., generally "TP", is defined, the passing of which shall be detected by the onboard unit 5 when the vehicle 4 travels on the road network 2. The virtual tolling points TP can, e.g., be defined in a middle of a road leg between two junctions, as is shown in the left half of FIG. 1 for virtual tolling points A, B, C; or can be defined at junctions of two or more road legs, as is shown in the right half of FIG. 1 for virtual tolling points D, F, G.

The virtual tolling points TP can be of any kind as described at the outset, including—but not restricted to—virtual toll plazas, highway entrances or exits, border crossing points, city centers, parking lot gates, and the like.

The set of virtual tolling points TP is stored in a memory 7 of the onboard unit 5. The virtual tolling points TP are optionally stored in graph form in the memory 7, i.e., as nodes linked by connecting lines such as in the graph 1 of FIG. 1, so that for each virtual tolling point TP the next virtual tolling points TP that can be reached by the vehicle 4 in the road network 2 can be identified as neighbouring nodes. In the example of FIG. 1, when travelling from virtual tolling point A, the next (neighbouring) virtual tolling points or nodes would be the virtual tolling points B and C, but not D-G.

Figure 2:
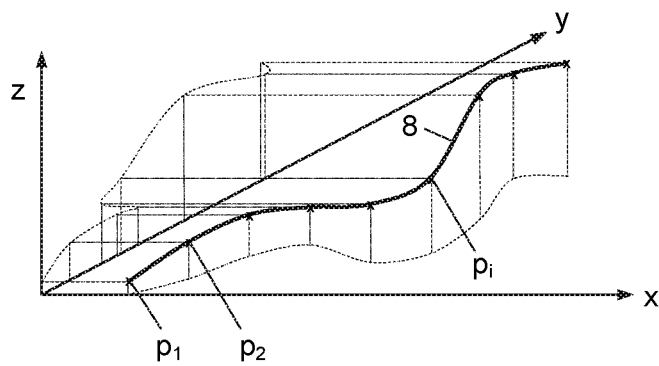
FIG. 2 shows in the top and middle diagram a sequence of position fixes and a sequence of distances to a virtual tolling point, respectively, in a three-dimensional space representation, and in the bottom diagram a sequence of distances over time.
Figure 2:
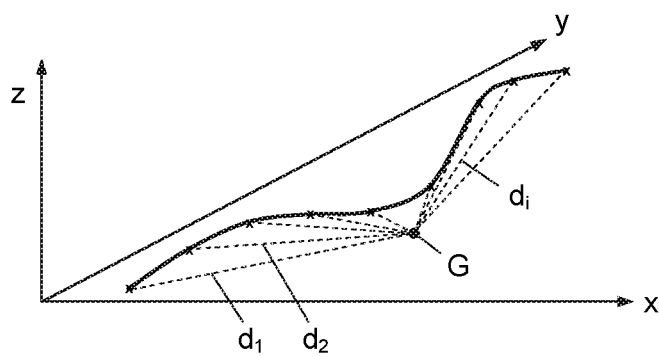
Figure 2:
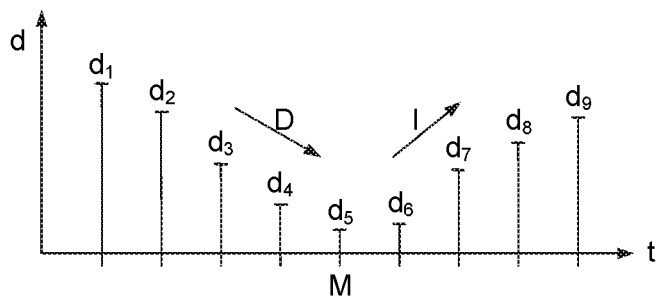

FIG. 2, top diagram, shows an exemplary sequence of position fixes $p_1$-$p_9$ obtained by the GNSS receiver 6, depicted as a—polygonal or (here) interpolated—spline 8 in a three-dimensional coordinate system with the axes x, y, z. As can be seen, the sequence of position fixes $\{p_1, \ldots, p_9\}$ or spline 8, respectively, comprises height information in the z-axis direction, i.e., each position fix $p_i$ has three-dimensional coordinates $x_i/y_i/z_i$. In a simplified embodiment (not shown) the position fixes $p_i$ could also be only two-dimensional in the x/y plane.

Referring to the middle diagram of FIG. 2, for each position fix $p_i$ a distance $d_i$ to one of the virtual tolling points TP (here the exemplary tolling point G) is calculated. For three-dimensional position fixes $p_i$, also the tolling points TP are defined with three-dimensional coordinates, and the distances $d_i$ are calculated in a three-dimensional space between each position fix $p_i$ and that tolling point TP whose passing shall be detected.

In the bottom diagram of FIG. 2, the distances $d_i$ are depicted as a sequence, i.e., discrete curve, over time t. As can be seen, the sequence $\{d_i\}$ of distances $d_i$ shows a global minimum M at distance $d_5$, preceded by a descent D (from $d_1$ to $d_4$) and followed by an increase I (from $d_6$ to $d_9$) when the virtual tolling point G is passed. This behaviour can be used as a detection criterion for detecting the passing of a virtual tolling point TP, as follows.

To this end, the OBU 5 comprises a buffer 9 (FIG. 3) which can store the sequence $\{d_i\}$ of distances $d_i$ for an analysis by a processor 10 of the OBU 5 as to the occurrence of the descent D, global minimum M, and increase I, respectively. The buffer 9 is a first-in first-out (FIFO) buffer, e.g., a shift register, which receives the most recent (newest) distance $d_i$ at one end and drops or discards the N-oldest distance $d_{i-N}$ at the other end, so that it contains at any time a sequence $\{d_i, \ldots, d_{i-N}\}$ or time window T of N differences $d_i$. This is shown in FIG. 4 for three exemplary instances of time before (top diagram), during (middle diagram) and after (bottom diagram) the passing of a virtual tolling point TP.

Figure 3:
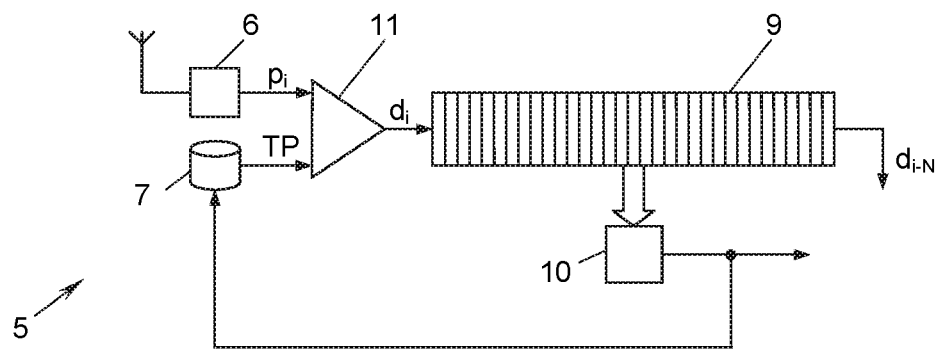
FIG. 3 is a block diagram of an onboard unit for performing the method of the disclosed subject matter.

As shown in FIG. 3, the sequence $\{d_i\}$ of distances $d_i$ can be calculated in that from each position fix $p_i$ the coordinates of the virtual tolling point TP are subtracted (see subtractor 11), so that the buffer 9 is successively filled with calculated distances $d_i$. Alternatively, the buffer 9 could be filled with the incoming position fixes $p_i$, and the virtual tolling point TP can be subtracted from each position fix $p_i$ in the buffer 9 which, of course, is equivalent.

Figure 4:
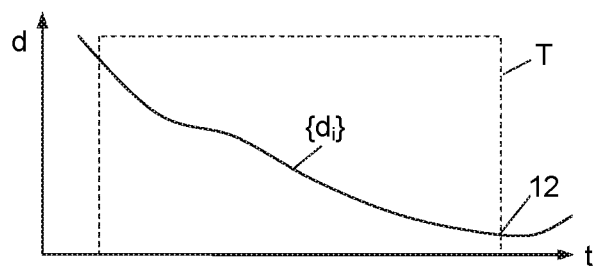
FIG. 4 are snapshots at three different instances of time of the buffer of the onboard unit of FIG. 3 containing the sequence of distances.
Figure 4:
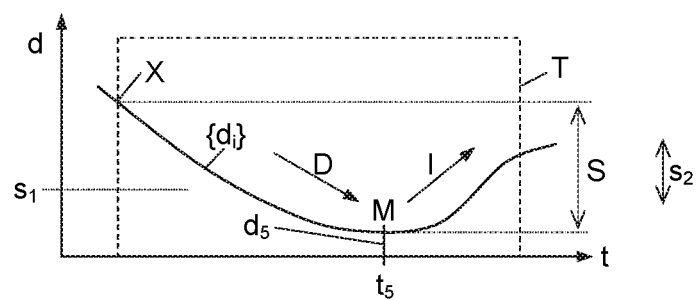
Figure 4:
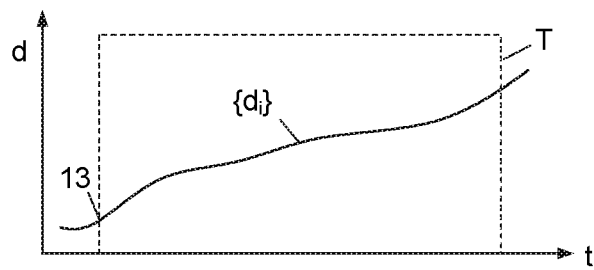

As shown in FIG. 4, it would not be sufficient to search for a global minimum M in the sequence $\{d_i\}$ or time window T of distances $d_i$, since such a global minimum M could occur at the borders 12, 13 of the window T as shown in the top and bottom diagrams. Rather, the detection criterion for detecting the passing of a virtual tolling point TP is the detection of a global minimum M within the sequence $\{d_i\}$ or time window T followed by an increase I; it is not necessary to also detect the preceding descent D. When such a global minimum M followed by an increase I is found in the sequence $\{d_i\}$ of distances $d_i$, then the passage of the virtual tolling point TP is detected (here: at the time of occurrence $t_5$ of the distance $d_5$).

Furthermore, additional criteria can be applied on the sequence $\{d_i\}$ to enhance detection reliability. A first criterion may be that the global minimum M found should lie below a first threshold $s_1$ to yield a detection. In other words, if the global minimum M is above the threshold $s_1$, the virtual tolling point TP is too far off from the spline 8 so that no detection is made.

A second criterion can be that the spread S of the distances $d_i$ in the sequence $\{d_i\}$ or time window T, respectively, i.e., the difference between the global minimum M and a global maximum X in that window T, is above a second threshold $s_2$. In other words, if the spread S is too small, i.e., below the second threshold $s_2$, the sequence $\{d_i\}$ or curve of distances $d_i$ is to "shallow" within the buffer 9, or time window T, respectively, indicating an unsure pass which does not qualify for a detection result.

Figure 5:
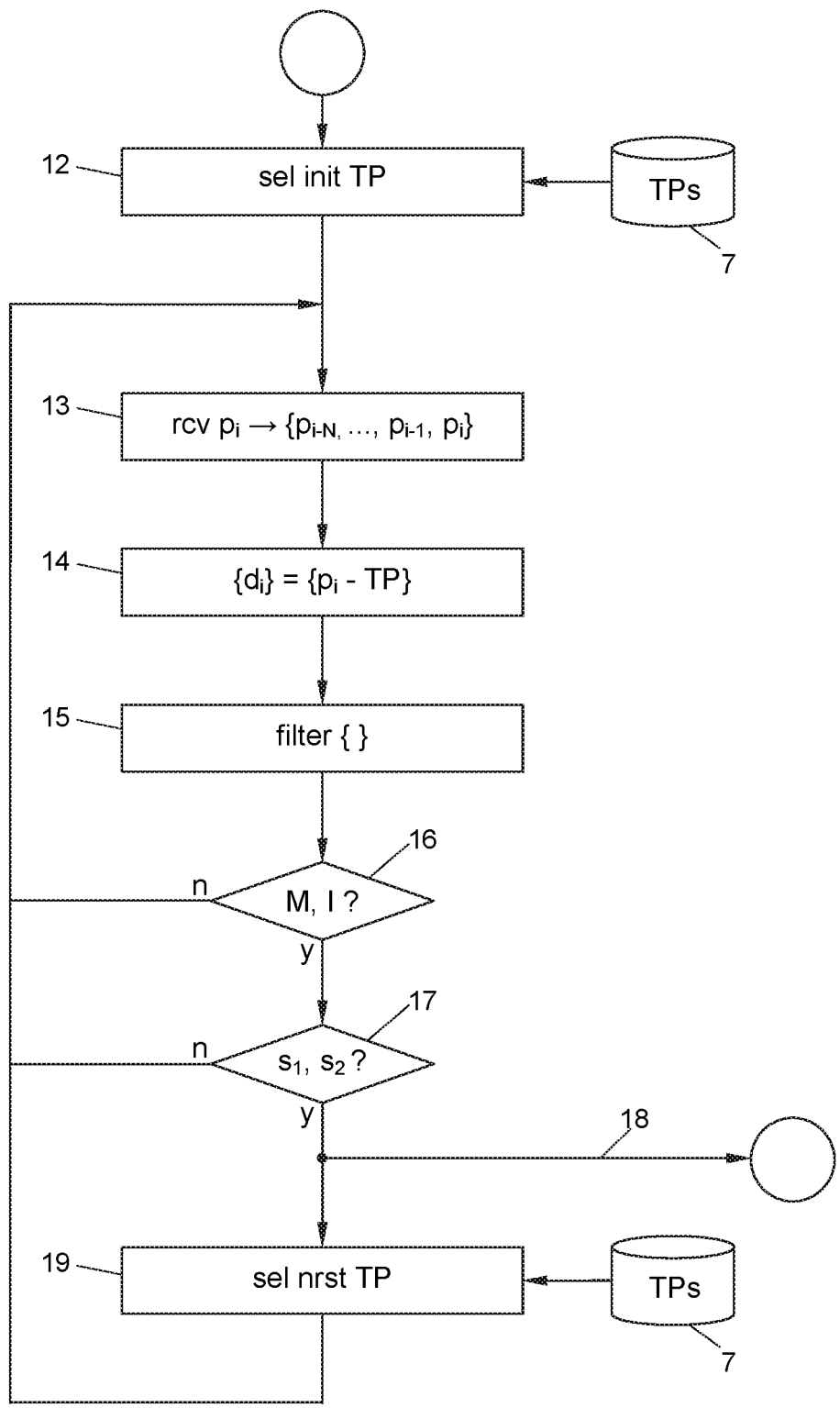
FIG. 5 is a flowchart of an embodiment of the method of the disclosed subject matter.

FIG. 5 shows an exemplary implementation of the method to be carried out by the processor 10 of the onboard unit 5.

In an initializing step 12, a first tolling point TP of the set of virtual tolling points TPs stored in the memory 7 may be selected. To this end, e.g., simply that tolling point TP of the stored set is selected that is nearest to a most recent (initial) position fix $p_1$ of the GNSS receiver 6.

If there is more than one tolling point TP from the stored set in close proximity to the initial position fix $p_1$, the further method steps 13-18 shown in FIG. 5 could be performed for each of those closest tolling point TPs; and when the pass of the first one of these closest tolling points TPs is detected, then the method threads 13-18 of the remaining ones of those closest tolling points TPs can be aborted.

Having ascertained the virtual tolling point TP to start with in step 12, the method now starts with gathering a sequence of N position fixes $p_i$ from GNSS receiver 6 (step 13) and calculating the sequence $\{d_i\}$ of distances $d_i=p_i-TP$ by using the buffer 9 (step 14). Of course, as described above, steps 13 and 14 can be performed in one step in that after each step of obtaining of a position fix $p_i$ the distance $d_i$ could be immediately calculated so that the buffer 9 fills with distances $d_i$ right away.

Step 15 shows an optional filtering step in which the sequence of position fixes $\{p_i\}$ and/or the sequence of distances $\{d_i\}$, respectively, is smoothed over time t by conventional filtering techniques such as a gliding mean value, curve matching technique, removal of outliers, etc. Filtering can also be made recursively, and filtering can be performed on the position fixes $p_i$, on the distances $d_i$, or on both, as required.

In step 16 the (optionally filtered) sequence $\{d_i\}$ of distances $d_i$ is searched for a global minimum (lower extremum) M followed by an increase I. Such an increase I can, e.g., be the detection of a distance $d_i$ higher than the minimum M found, here $d_6$, which is greater than $d_5$, or, optionally, by the detection of two successively higher distances following the global minimum, here $d_7>d_6>d_5=M$. Alternatively, a gradient of the sequence $\{d_i\}$ of distances $d_i$ can be analyzed to detect the global minimum M (gradient is zero) and the increase I (gradient greater than zero).

If a global minimum M followed by an increase I cannot be found (branch "n"), the method returns to the beginning of step 13, where a new position fix $p_{i+1}$ is obtained and a new distance $d_{i+1}$ is calculated and appended to the sequence $\{d_i\}$, while the oldest distance $d_{i-N}$ is discarded from the sequence, to shift the buffer 9 and the time window T forward.

However, if the search in step 16 was successful (branch "y"), the method proceeds to an optional verification step 17, in which the above mentioned criteria regarding the thresholds $s_1$ and/or $s_2$ are tested. That is, in optional step 17 it is checked whether the minimum M found is below the first threshold $s_1$ and/or the spread S of the sequence $\{d_i\}$ is above the second threshold $s_2$. If either criteria fails (branch "n"), the method returns to the beginning of step 13. If both criteria are met, the detection of passing the virtual tolling point TP is verified and a detection result is output (18).

Of course, the order of the test steps 16 and 17 can be changed, i.e., before searching for the minimum M and increase I in step 16, the sequence $\{d_i\}$ can be analyzed for fulfilling the criteria $s_1$, $s_2$, saving some processing power for minimum and increase searching when those criteria are not met.

So far, the methods detected the passing of one, e.g., the first or initially nearest, virtual tolling point TP of the set stored in the memory 7. In the further course, the method can be repeated to detect the passing of a next virtual tolling point TP on the way of the vehicle 4 in the road network 2.

To this end, in a subsequent step 19 following the successful detection 18 of the most recent virtual tolling point TP, the next (nearest) virtual tolling point(s) TPs from the set stored in the memory 7 is/are selected. In the selection step 19, the graph structure of the stored virtual tolling points TPs may be used to ascertain this or those one(s) of the virtual tolling points TPs in the memory 7 that is/are actually reachable by the vehicle 4 in the road network 2 when starting from the recently detected virtual tolling point TP. These are the virtual tolling points TPs that in the graph 1 are neighbouring nodes of the recently detected (used-so-far) virtual tolling point TP. For example, when a passage of the virtual tolling point A has been detected in the first runthrough of the method, i.e., in the steps 13-18, then in step 19 the virtual tolling points B and C may be retrieved as neighbouring nodes of node A in graph 1, and the method is repeated, i.e., returned to the beginning of step 13, for each of those neighbouring nodes B and C. That is, a new thread 13-18 of the method is started for detecting the passing of the virtual tolling point (node) B and a second new thread 13-18 is started for detecting the passing of the virtual tolling point (node) C. When the first one of these threads 13-18 detects a passing, here, e.g., the node B, then it is sure that the vehicle 4 has taken the route A-B and not A-C, and the thread 13-18 started for detecting the passing of node C can be aborted.

In this way, after detecting the passing of virtual tolling point B in step 18, the method can always select in the step 19 the next reachable nodes as new virtual tolling point(s) TP to be detected in the next threads (run-throughs) of the method.

From detecting a predetermined sequence of virtual tolling points TP in this way, such as A-B-D-E-F-G in the example of FIG. 1, the travelling of the vehicle 4 on a specific route in the road network 2, identified by that sequence of tolling points TP, can then be ascertained.

CONCLUSION

The disclosed subject matter is not restricted to the specific embodiments disclosed herein, but encompasses all variants, equivalents, modifications and combination thereof which fall into the scope of the appended claims.

What is claimed is:

1. A method of detecting the passing of a virtual tolling point by a vehicle travelling on a road network, comprising the steps in the following order:
   a) calculating a sequence of positive distances between position fixes and the virtual tolling point, said position fixes being sequentially obtained from a GNSS receiver carried by the vehicle; and
   b) searching said sequence of positive distances for a global minimum followed by an increase and, if such is found,
   then
   c) detecting the passing of the virtual tolling point;
   else
   d) appending a new positive distance calculated between a newly obtained position fix and the virtual tolling point to the sequence while discarding the oldest positive distance from the sequence, and returning to step b).

2. The method of claim 1, wherein the virtual tolling points are defined each as three-dimensional coordinates and the position fixes are obtained each as three-dimensional coordinates.

3. The method of claim 1, comprising, preceding step a), the steps:
   storing a set of virtual tolling points of the road network in a memory;
   obtaining a position fix from the GNSS receiver; and
   selecting, as said virtual tolling point, from said stored set a virtual tolling point that is nearest to said position fix.

4. The method of claim 3, wherein the virtual tolling points in the stored set form nodes in a graph representing the road network, comprising, succeeding step c), the step:
   selecting, from the stored set, as a virtual tolling point to be used in the further steps of the method, a virtual tolling point which is one of the neighbouring nodes of the virtual tolling point used so far, and returning to step a).

5. The method of claim 4 which is performed for each neighbouring node, wherein, when one of said neighbouring nodes is passed first, the method is aborted for the remaining of said neighbouring nodes.

6. The method of claim 1, wherein in step b) said increase is defined by two successively higher positive distances following the global minimum.

7. The method of claim 1, wherein in step a) the position fixes are smoothed over time.

8. The method of claim 1, wherein in step b), when said global minimum lies above a first threshold, the method directly proceeds to step d).

9. The method of claim 1, wherein in step b), when the difference between said global minimum and a global maximum of said sequence lies below a second threshold, the method directly proceeds to step d).

10. The method of claim 1, which method is performed in an onboard unit carried by the vehicle and comprising the GNSS receiver, a memory for the storing virtual tolling point(s), a buffer for storing the sequence of positive distances, and a processor attached thereto for performing the steps of the method.

11. The method of claim 1, wherein in step a) the positive distances are smoothed over time.

* * * * *